United States Patent [19]

Clark et al.

[11] 4,209,431

[45] Jun. 24, 1980

[54] ALKYL-SUBSTITUTED HYDROQUINONE CARBONATE ESTERS AS STABILIZERS FOR OLEFIN POLYMERS

[75] Inventors: John R. Clark, Nutley; Michael H. Fisch, Wayne, both of N.J.

[73] Assignee: Witco Chemical Corporation, New York, N.Y.

[21] Appl. No.: 874,979

[22] Filed: Feb. 3, 1978

[51] Int. Cl.$^2$ .................... C08K 5/11; C07C 69/00
[52] U.S. Cl. .................... 260/23 H; 260/45.7 R; 260/45.95 H; 260/45.95 R; 260/463
[58] Field of Search ......... 260/463, 45.95 H, 45.95 R, 260/45.7 R, 45.85 T, 45.85 B, 23 H; 528/196; 252/400 A

[56] References Cited

U.S. PATENT DOCUMENTS

| | | | |
|---|---|---|---|
| 2,999,842 | 9/1961 | Csendes | 260/45.95 E |
| 3,211,776 | 10/1965 | Stephens | 260/463 |
| 3,244,650 | 4/1966 | Hecker | 260/45.95 E |
| 3,404,122 | 10/1968 | Fritz | 260/47 XA |
| 3,635,895 | 1/1972 | Kramer | 528/196 |
| 3,737,486 | 6/1973 | Schutze et al. | 260/45.95 D |
| 4,032,510 | 6/1977 | Floyd et al. | 260/45.85 S |
| 4,104,217 | 8/1978 | Leistner et al. | 528/196 |

OTHER PUBLICATIONS

Ca-61, 11923f (1963).

*Primary Examiner*—V. Pittoke

[57] ABSTRACT

Alkyl-substituted hydroquinone carbonate esters are provided which enhance the resistance of olefin polymers to oxidative and thermal degradation, as well as olefin polymer compositions containing such alkyl-substituted hydroquinone carbonate esters.

35 Claims, No Drawings

ALKYL-SUBSTITUTED HYDROQUINONE CARBONATE ESTERS AS STABILIZERS FOR OLEFIN POLYMERS

Polypropylene is a tough, hard, relatively flexible, high-melting polymeric material, and thus has a number of important applications, such as, for example, as electrical insulation for copper wires and cables. However, in several respects the stability of polypropylene leaves much to be desired. The polymer shows a tendency to decrease rapidly in melt viscosity and then to become brittle when kept at elevated temperatures for the time required in milling, calendering, extrusion, injection molding, and fiber-forming equipment. This deterioration is particularly serious when the polymers are worked in a molten state in the presence of oxygen, for example, air. It is known in the art that degradation in one or more physical properties of polypropylene due to heat can be inhibited by the incorporation of a number of well known thermal antioxidants, including hindered phenols, secondary aromatic amines, organic phosphites, and thiodipropionic acid esters.

Bown et al U.S. Pat. No. 3,510,507 patented May 5, 1970, and Schutze et al U.S. Pat. No. 3,655,718 patented Apr. 11, 1972 proposed bisphenol polyborates, polycarbonates and polysilicates as antioxidants for polyolefins, enhancing the resistance of the polyolefins to oxidative degradation. The bisphenol esters described are defined by the formula:

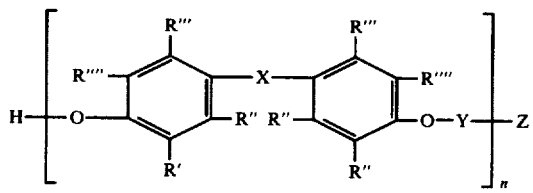

where:
(1) X is selected from the group consisting of:
(a) —S—

where
R is hydrogen, a $C_1$ to $C_3$ alkyl, an aryl group or combination of these.

(d) —C—C—
and
(e) —C—A—C—
where
A is a $C_1$ to $C_{16}$ alkylene or an arylene.
(2) R', R'', R''', and R'''' are selected from the group consisting of hydrogen, $C_1$ to $C_{18}$ alkyls, and an aryl group.
(3) Y is selected from the group consisting of:

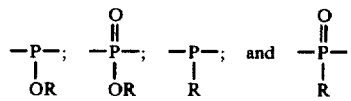

where
R is hydrogen, a $C_1$ to $C_{18}$ alkyl or aryl,

where
R is hydrogen, a $C_1$ to $C_{18}$ alkyl or aryl.

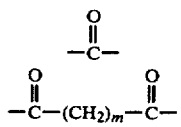

where
m=0 to 10, preferably 4 and 8.

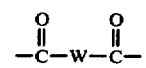

where
W is —(CH$_2$)$_n$—S—(CH$_2$)$_n$— or —(CH$_2$)$_n$—S—(CH$_2$)$_m$—S—(CH$_2$)$_n$—
where
n=0 to 10, preferably 2 and m=0 to 10, preferably 5.

where
R is an alkyl, preferably —CH$_3$.

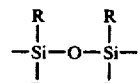

where
R is an alkyl, preferably —CH$_3$.
(4) Z is

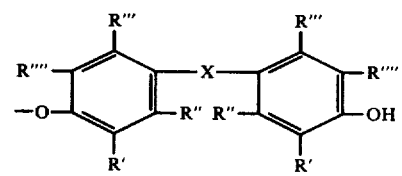

where
R', R'', R''', R'''', and X correspond respectively to the R', R'', R''', R'''', and X previously selected when n has a value from 1 to 15; or Z may be derived from the compound used to introduce Y into the product when n has a value from 2 to 15;

for example, —R or —OR where R is hydrogen, an alkyl, or aryl.

These bisphenol esters are bisphenol polycarbonate esters when Y is

 (c)

Brown et al and Schutze et al assert that these polymers are advantageous over known stabilizers in that the polymers have improved color, increased stability and superior odor. The esters also have a markedly decreased volatility, as compared to known stabilizers, and are therefore advantageous for high temperature applications.

Floyd and Plank U.S. Pat. No. 4,032,510 patented June 28, 1977, propose an improvement on the Brown et al and Schutze et al bisphenol esters by eliminating residual bisphenolic free hydroxyl groups. Floyd et al state that although the stabilizers of the Brown et al and Schutze et al patents contain free hydroxyl groups, and are generally acceptable antioxidants, their stabilizing efficiency sometimes diminishes, due to the interaction between the free hydroxyl groups and certain acid basic or metallic ions released from various sources, such as containers. Such loss of antioxidant effectiveness is often evidenced by early color development in the substrates where the stabilizers have been added. Accordingly, Floyd et al caps or replaces the reactive terminal hydroxyl groups with certain groups, thereby obtaining compounds which are said to be improved oxidation stabilizers, and also are effective against ultraviolet light degradation of various polymeric hydrocarbons. The Floyd et al compounds are defined by the structure:

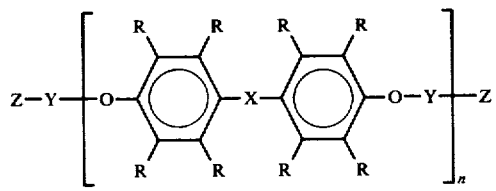

where
R, X (linking group), Y (condensing group), Z (capping group) and n have the meanings indicated below.

1. R's, which can be either the same or different, are selected from the group consisting of:
   a. —H;
   b. $C_1$-$C_{18}$, preferably $C_1$-$C_8$ and more preferably $C_1$-$C_4$ primary, secondary or tertiary alkyl groups; and
   c. an aryl group.

2. X may be selected from the group consisting of:
   (a) —S—;

(b)
   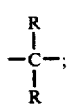

(c) —SO—;
   (d) —$SO_2$—;

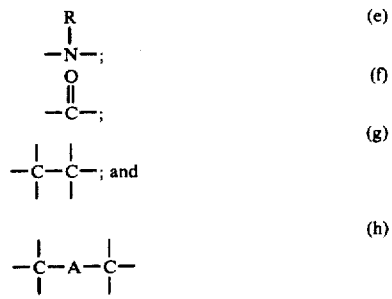

where
A is a $C_1$-$C_{16}$ alkylene or an arylene.

3. Y is selected from the group consisting of:

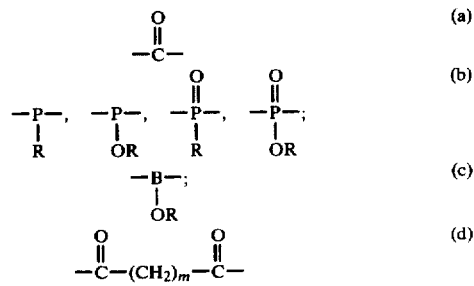

where
m=0–10, preferably 4–8 and more preferably 4–5;

where
W is —$(CH_2)_2$—S—$(CH_2)_k$—S—$(CH_2)_2$— with k=0–10, preferably 2–6 and more preferably 2–4; and

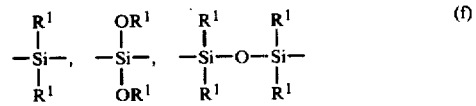

where
$R^1$'s, which may be the same or different, are $C_1$-$C_{10}$, preferably $C_1$-$C_4$ alkyl groups and more preferably —$CH_3$.

4. Z is selected from the group consisting of:

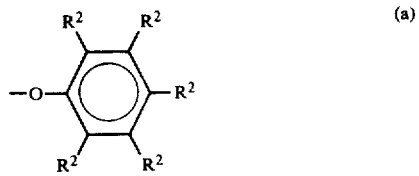

where
$R^2$'s, which may be the same or different, are —H, or $C_1$-$C_{18}$ alkyl groups, preferably —H or $C_1$-$C_8$ alkyl groups and more preferably —H or $C_1$-$C_4$ alkyl groups;
(b) —OH when Y is not

and (c) —O—R³ where

R³ is an alkyl group having 1 to 18, preferably 1 to 6 and more preferably 2 to 4 carbon atoms.

5. n may have a value ranging from 1 to 15, preferably 3 to 8 and more preferably 4 to 6.

These compounds are also bisphenol polycarbonates when Y is

as in (a) above.

In a recent publication, *Meeting Preprints*, Society of Plastics Engineers, Houston Texas, April 1975, pages 33–37, "Polycarbonates: a New Concept in Stabilization for polypropylene", Plank and Floyd assert that bisphenol polycarbonates, especially when used in combination with a thioester, form a very effective stabilizing system for olefin polymers, and are at least equal to commercially available antioxidants in stabilizing effectiveness.

Floyd and Plank spent some time investigating the reaction mechanism by which these polycarbonates function as stabilizers. They state that their results indicate that although the polycarbonates function well as antioxidants, free OH groups are not necessary. Thus, the polycarbonates do not act as labile hydrogen donors, in the manner of hindered phenols. In comparisons with hindered phenols, the polycarbonates were found to show no inhibition period, whereas the hindered phenols showed a definite inhibition period before the onset of oxidation. The polycarbonates showed only a general retardation of the oxidation rate.

Consequently, Floyd and Plank concluded that, since thioesters function by decomposing hydroperoxide, the fact that the polycarbonates form synergistic combinations with thioesters suggests that the polycarbonates react with a species other than the hydroperoxides in the oxidation process. Floyd and Plank suggest that the polycarbonates react with peroxy radicals, but in a manner so as not to reform hydroperoxide. They suggest that the peroxy radical attaches to the carbonyl carbon, including a polymer, to give a phenoxy radical and a peroxy carbonate. The peroxy carbonate is unstable, and cleaves, to give an alkoxy radical and another phenoxy radical, as well as carbon dioxide. Thus, the polycarbonates intercept the peroxy radical, but unlike the hindered phenols, do not regenerate hydroperoxide.

In accordance with the instant invention, it has been determined that dialkyl-substituted hydroquinone carbonate esters preferably containing free phenolic hydroxyl groups not only are effective in enhancing the resistance of olefin polymers to oxidative and thermal degradation, but are more effective in this respect than the bisphenol polycarbonate esters of the Bown et al, Schutze et al and Floyd et al patents, noted above.

The alkyl-substituted hydroquinone carbonate esters of the invention have a molecular weight within the range from 342 to 46 and are defined by the following general formula:

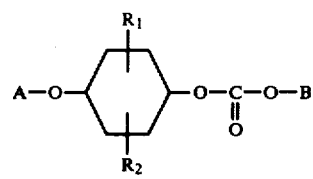

In the formula:

$R_1$ and $R_2$ are selected from the group consisting of t-butyl and t-amyl;

A is selected from the group consisting of hydrogen and

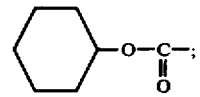

and

B is selected from the group consisting of

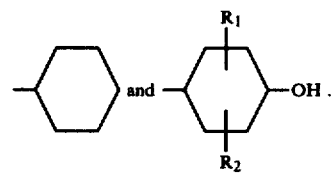

Especially preferred are the 2,5-di-tertiary butyl compounds, and next preferred are the 2,5-di-tertiary amyl compounds.

The following compounds are exemplary of the alkyl-substituted hydroquinone carbonate esters falling within the invention:

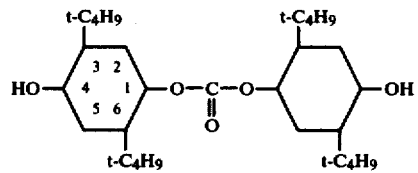

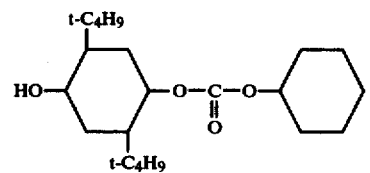

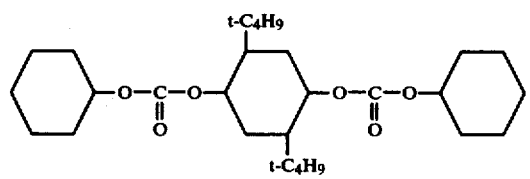

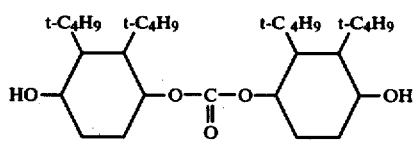

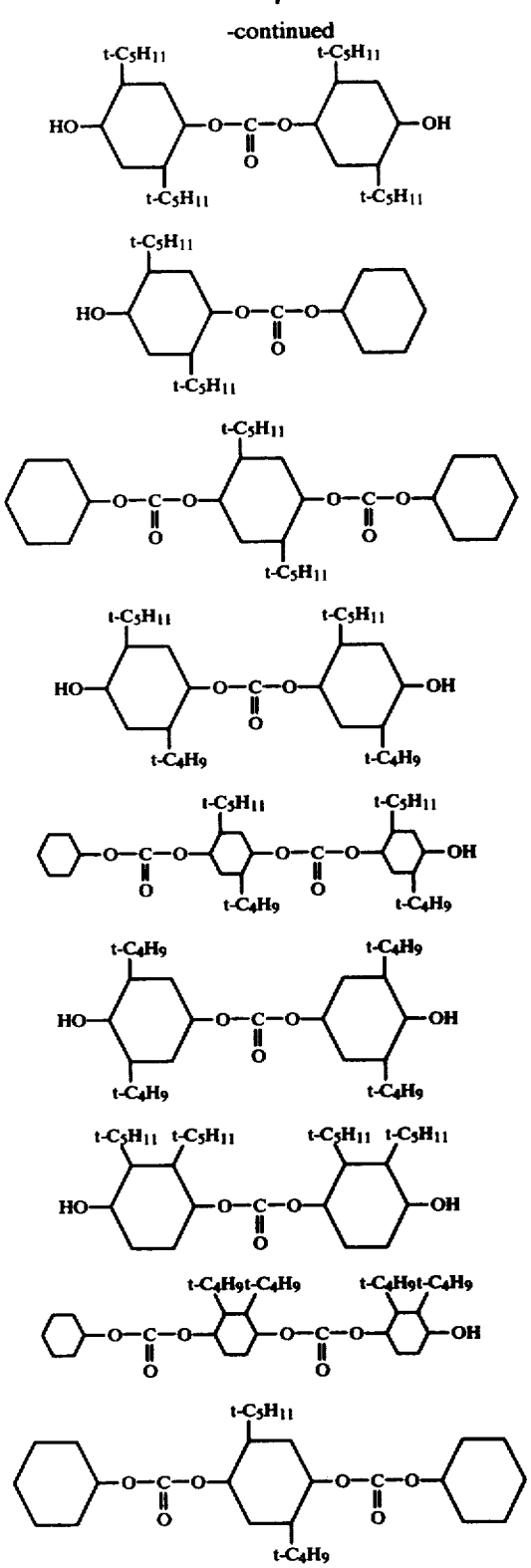

The alkyl-substituted hydroquinone carbonate esters in accordance with the invention are readily prepared by known procedures.

The alkyl-substituted hydroquinones react with aromatic carbonates such as diphenyl carbonate in the presence of an alkaline catalyst, with heating, in a transesterification reaction in liberation of the aromatic phenol corresponding to the aromatic carbonate (i.e., phenol, in the case of diphenyl carbonate). Removal of the aromatic phenol (which should have a lower boiling point than the alkyl-substituted hydroquinone; phenol does) drives the reaction to completion, and results in the formation of an alkyl-substituted hydroquinone carbonate ester.

A molar ratio of two moles of alkyl-substituted hydroquinone to one mole aromatic carbonate yields a bis-alkyl substituted hydroquinone carbonate ester;

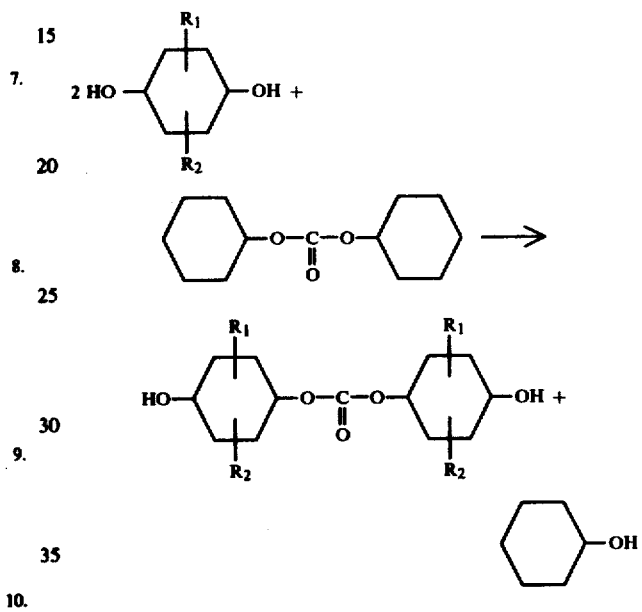

A molar ratio of one mole of alkyl-substituted hydroquinone to one mole aromatic carbonate yields a mixture of products predominantly of molecular weight within the range from 342 to 646.

Removal of phenol under mold conditions (water wash) avoids polymerization of the product higher molecular weight materials. Any over-high molecular weight product can be removed by precipitation by methanol, in which the lower molecular weight products of the invention are soluble.

A molar ratio of two moles of aromatic carbonate to one mole alkyl-substituted hydroquinone yields a bis-phenyl alkyl-substituted hydroquinone bis-carbonate ester;

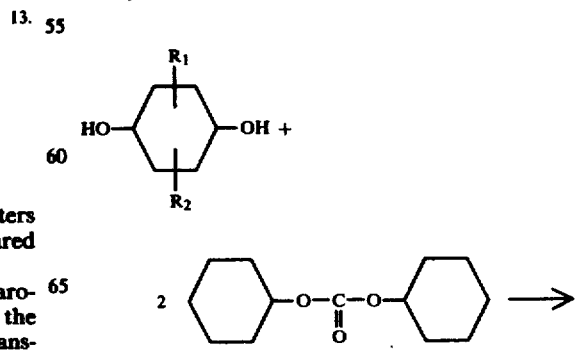

-continued

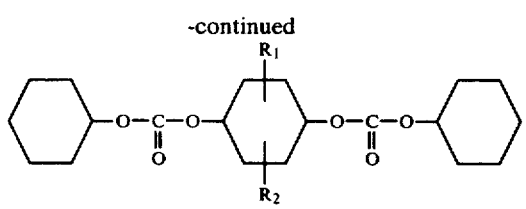

It is also possible to transesterify the bis-carbonates of the invention in the presence of an alkaline catalyst to form the various monocarbonates. The following is illustrative:

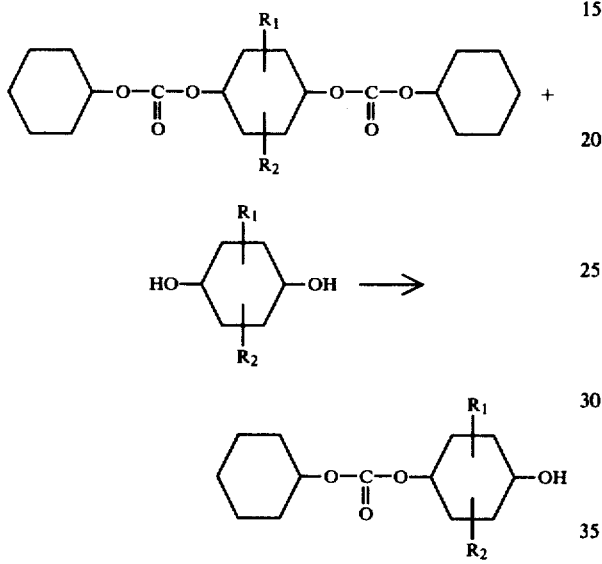

Any alkaline catalyst known to function as a catalyst in esterification reactions can be employed. The catalyst employed ordinarily for transesterification is an alkali or alkaline earth metal, which can be added in the form of the metal or in the form of an alkaline compound, such as an alkaline oxide or hydroxide, or alkaline inorganic or organic acid salt, such as the carbonate or hydride, or as the alcoholate. Sodium is quite satisfactory and so are sodium hydroxide, lithium carbonate, sodium carbonate, potassium carbonate, lithium hydroxide, potassium hydroxide, sodium hydride, lithium hydride, potassium hydride, calcium hydride, sodium acetate, sodium formate, potassium acetate, the oxides and hydroxides of calcium strontium and barium, and the alcoholates, usually of methyl, ethyl or isopropyl alcohol, or phenolates of all of these metals. Only a very small amount of the catalyst need be employed, for example, as little as from 0.01 to 2% by weight of the alkyl-substituted hydroquinone.

It is usually desirable that the reactants be anhydrous, although very small amounts of water can be tolerated in the system. If sodium or potassium or the oxides of calcium, barium, and strontium are added, they will react with the water or alcohol present to form the corresponding hydroxide or alcoholates, and the latter compound will then serve as a catalyst. A volatile alcohol, such as ethanol, methanol or isopropyl alcohol, can be added as a solvent, if the reactants are incompatible.

Aromatic carbonates which are suitable, and liberate a phenol having a lower boiling point than alkyl-substituted hydroquinones, include diphenyl carbonate, dixylyl carbonate, and ditolyl carbonate.

The transesterification reaction proceeds at elevated temperatures within the range from about 40° to about 200° C., and preferably from about 90° to about 175° C.

The phenol corresponding to the aryl group of the carbonate being substituted by the alkyl-substituted hydroquinone is liberated in the course of the reaction and, in order to drive the reaction to completion, it is usually desirable to continuously distill off the liberated phenol. The reaction can be carried out for several hours time, and the phenol then distilled out, in order to drive the reaction to completion. Vacuum distillation can be used if the phenol or alcohol has a high boiling point.

The alkyl substituted hydroquinones also react with chloroformates to form the corresponding bis-carbonates:

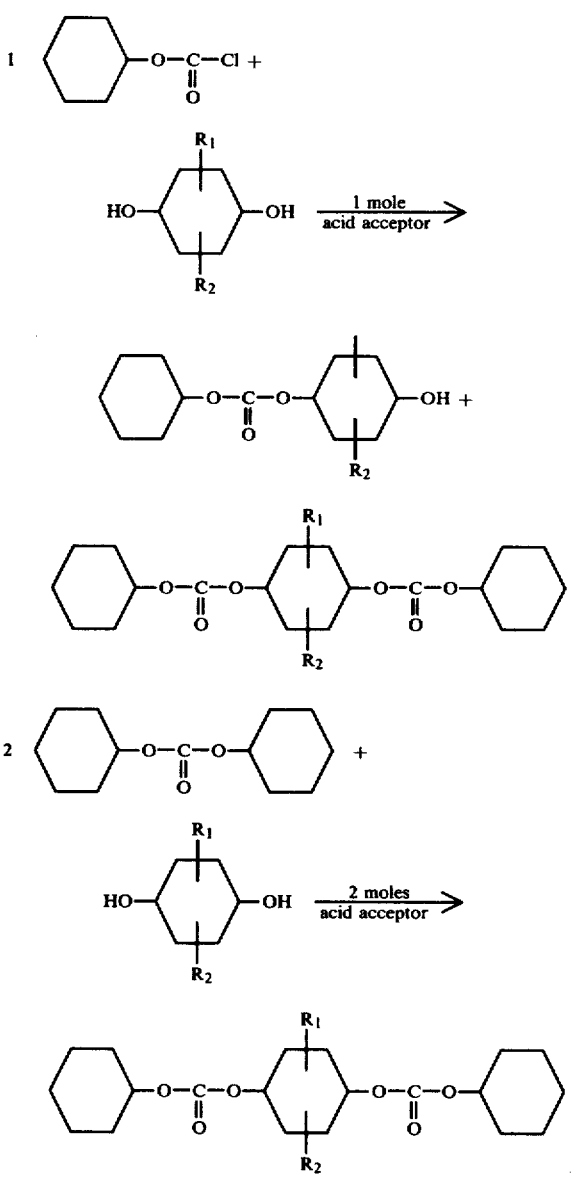

As the acid acceptor, any tertiary amine inorganic alkali can be used. The alkalis include those referred to above. The tertiary amines include triethylamine, tributylamine, pyridine, etc. Phosgene also reacts in this way.

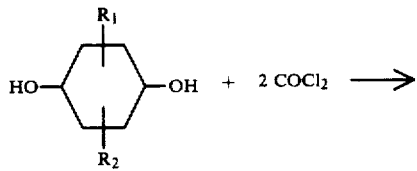

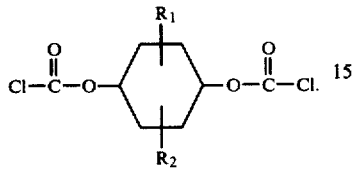

The bis-chloroformate of hydroquinone reacts with phenols as follows:

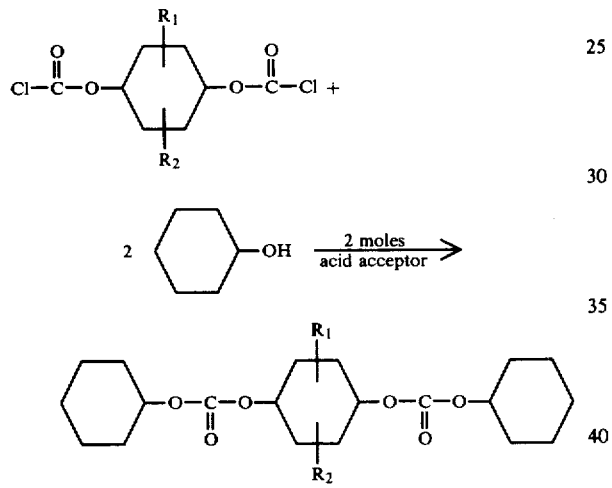

The following Examples illustrate the preparatory procedure:

EXAMPLE I

A mixture of 2,5-di-tertiary butyl hydroquinone carbonate ester species was prepared from 2,5-di-tertiary butyl hydroquinone, according to the following procedure.

2,5-di-tert-butyl-hydroquinone 22.2 g (0.1 mole) was reacted with 21.4 g (0.1 mole) diphenyl carbonate and 0.1 g sodium acetate catalyst in a flask heated in an oil bath at 160° C.

After one-half hour phenol was refluxing. The bath temperature was raised to 190° C. and phenol stripped off, after which 30.0 g solid residue was recovered, m.p. 208°–260° C.

The composition of the reaction product was determined by gel permeation chromatography, preparing and filtering diluted solutions of these compounds in tetrahydrofuran. An aliquot of the filtered solutions was injected in the liquid chromatograph with Refractive Index (RI) and Ultra Violet (UV) monitoring.

The gel permeation chromatographic analysis system comprised five columns in series of the following porosities and in the following order: (Å): $10^4$, $10^3$, $2 \times 500$ and 100 Å. The exclusion limit of the $10^4$ Å column was 200,000 Daltons.

The carbonate esters were also analyzed by gas-liquid chromatography, using the following conditions:

| | |
|---|---|
| Column : | 1½′ × ⅛″ 10% high boiling liquid |
| Detector : | 350° C. |
| Injection Port : | 300° C. |
| Program : | $T_1 = 110°$ C. for 2 minutes |
| | 32° C./minute to 330° C. |
| | $T_e = 330°$ C. for 8 minutes |

The highest molecular weight component which can be detected by this method is three hydroquinone units. Phenol, 2,5-di-t-butyl hydroquinone, diphenyl carbonate, and 2,5-di-t-butyl phenyl-bis-(1,4-phenyl carbonate) were identified by comparison with a known sample.

The gel permeation analysis showed the presence of phenol, diphenyl carbonate, 2,5-di-t-butyl-phenylene-1,4-bis-(phenyl carbonate)

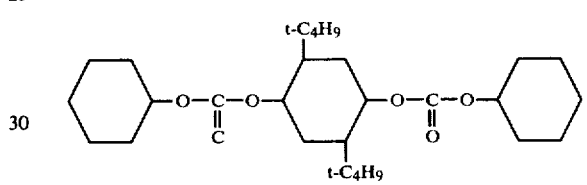

4-hydroxy-2,5-di-t-butyl phenyl phenyl carbonate

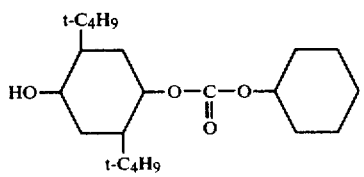

and small amounts of higher molecular weight material. Gas liquid chromatography measured 18.9% diphenyl carbonate, 4% di-t-butyl hydroquinone, 46.4%

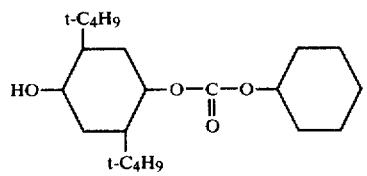

13.9%

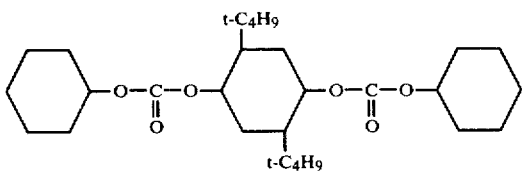

and 16.8%

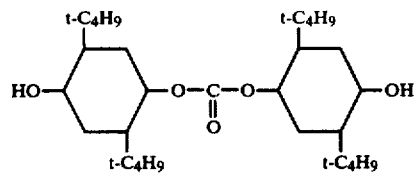

EXAMPLES II TO VII

Preparations were carried out of seven carbonates using diphenyl carbonate (DPC) and 2,5-dialkyl hydroquinones (HQ), following the general procedure of Example I, with the variations shown in Table I:

TABLE I

| Example No. | Alkyl substituent on hydroquinone | DPC:HQ molar ratio | Temp. °C. and Reaction time | Products | and | % |
|---|---|---|---|---|---|---|
| II | 2,5-di-t-C$_4$H$_9$ | 1:1 | 160° C. 30 minutes | mono-carbonate (HO–Ar–O–C(O)–O–phenyl) | | 38 |
| | | | | bis-carbonate (phenyl–O–C(O)–O–Ar–O–C(O)–O–phenyl) | | 44 |
| | | | | Phenol and DPC | | Balance |
| III | 2,5-di-t-C$_4$H$_9$ | 1:1 | 180° C. 2 hours | mono-carbonate | | 29 |
| | | | | bis-carbonate | | 32 |
| | | | | Polymers | | 25 |
| | | | | Phenol and DPC | | Balance |
| IV | 2,5-di-t-C$_4$H$_9$ | 1:1 | 200° C. 30 minutes | mono-carbonate | | 22 |
| | | | | bis-carbonate | | 18 |
| | | | | Polymers | | 45 |
| | | | | Phenol and DPC | | Balance |
| V | 2,5-di-t-C$_4$H$_9$ | 2:1 | 180° C. 30 Minutes | dimeric bis-hydroxy carbonate (HO–Ar–O–C(O)–O–Ar–OH) | | 51 |
| | | | | mono-carbonate | | 27 |
| | | | | Phenol and DPC | | Balance |
| VI | 2,5-di-t-C$_4$H$_9$ | 1:2 | 180° C. 30 minutes | bis-carbonate | | 86 |
| | | | | Phenol and DPC | | Balance |
| VII | 2,5-di-t-C$_5$H$_{11}$ | 1:1 | 180° C. 2 hours | mono-carbonate (with t-C$_5$H$_{11}$ substituents) | | 32 |

TABLE I-continued

| Example No. | Alkyl substituent on hydroquinone | DPC:HQ molar ratio | Temp. °C. and Reaction time | Products | and | % |
|---|---|---|---|---|---|---|
| | | | | 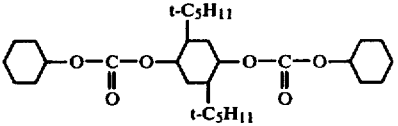 | | 37 |
| | | | | Polymers | | 12 |
| | | | | Phenol and DPC | | Balance |
| Control | t-butyl | 1:1 | 160° C. 30 minutes | Polymers Trace phenol No DPC | | More than 90 |

These experiments vis à vis the Control show that the course of the reaction is entirely different with two t-alkyl groups present on the hydroquinone, giving monomeric products under conditions where complete conversion to polymers occurs with t-butyl hydroquinone having only one t-alkyl group.

EXAMPLE VIII

Triethylamine 4.04 g (0.04 mole) was added dropwise to a solution of 2,5-di-t-butyl-1,4-phenylene bis-chloroformate 6.95 g, (0.02 mole) and 3.76 g (0.04 mole) phenol in 80 ml tetrahydrofuran initially at 22° C. The reaction produced a copious precipitate of triethylamine hydrochloride and a rise in temperature to 50° C. After cooling the mixture to 20° C. the hydrochloride was removed on a filter and washed with more tetrahydrofuran. The combined filtrate and washings were stripped of tetrahydrofuran and left 7.5 g of oily residue. This was rubbed with isopropyl alcohol and broke up into a slurry of crystals which were collected and dried to give 5.9 g 2,5-di-t-butyl-1,4-phenylene bis-(phenyl carbonate) having melting point 178° to 180° C. and the formula:

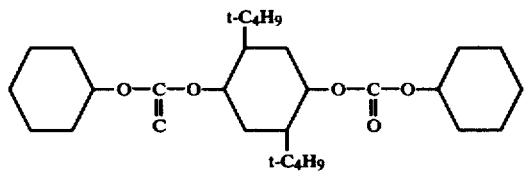

EXAMPLE IX

Diphenyl carbonate 21.4 g, 2,5-di-t-butyl hydroquinone 22.2 g and 0.1 g sodium acetate catalyst were heated to 180° C. under nitrogen and held for two hours. The reaction mixture was cooled to below 50° C., and dissolved in 100 ml toluene, resulting in a cloudy solution which cleared on warming. The solution was washed with successive portions of water, with each portion brought to boiling, and then allowed to separate, until analysis of the separated water phase showed no more phenol being extracted. The toluene solution was then dried by azeotroping under a Dean-Stark trap, and stripped under vacuum to give 24.8 g of a clear amber mass melting at 60° to 80° C. Analysis showed:

TABLE II

| Formula | Analysis |
|---|---|
| 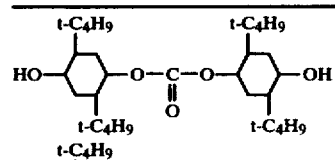 | 11.0% |
| 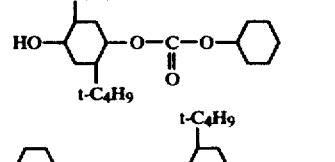 | 43.5% |
|  | 27.7% |
| Diphenyl carbonate Trace of phenol | 11.2% |

The removal of byproduct phenol by water washing resulted in a significantly increased formation of the three carbonate esters, compared to the distillation procedure.

EXAMPLE X

Diphenyl carbonate 21.4 g, 2,5-di-t-butyl-hydroquinone 22.2 g and sodium acetate 0.1 g were reacted and treated with toluene and water following the procedure and under the reaction conditions of Example III. The product (6 g) was warmed with toluene (60 ml) until dissolved, cooled back to 27° C., and treated with methanol (90 ml), resulting in the separation of a white solid which was collected and washed with methanol and dried to give 3.4 g grindable solid that did not melt when heated to 400° C. Evaporation of the methanol solution gave 2.6 g of tacky solid melting from 60° to 100° C.

Analysis of the methanol-soluble product showed:

TABLE III

| Formula | Analysis |
|---|---|
| 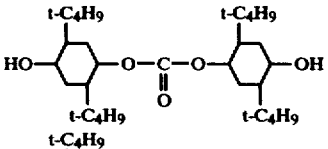 | 12.4% |
| 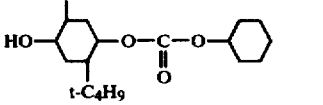 | 39.4% |

TABLE III-continued

| Formula | Analysis |
|---|---|
| 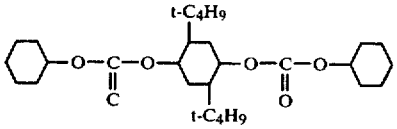 Some diphenyl carbonate | 32.1% |

The methanol-insoluble product showed only polymeric esters of average molecular weight above 1500.

EXAMPLE XI

Diphenyl carbonate and 2,5-di-t-butyl hydroquinone and sodium acetate catalyst were reacted following the procedure and under the reaction conditions of EXAMPLE III. A 14.8 g portion of the product was warmed with 150 ml methanol until the glassy product broke up into a fluid slurry. Filtration and washing as in Example X gave 9.6 g methanol-insoluble product and 5.2 g methanol-soluble product, whose analysis agreed with the soluble product of Example X.

The alkyl-substituted hydroquinone carbonate esters of the invention can be used as the only oxidation stabilizer for polyolefins. In general, however, better results are obtained when the alkyl-substituted hydroquinone carbonate esters are used in combination with at least one olefin polymer stabilizer effective to enhance the resistance of olefin polymers to oxidative and/or thermal degradation, and preferably two or more such stabilizers. It is well known that in the case of olefin polymers, combinations of stabilizers can be complementary, and can enhance resistance of the olefin polymer to oxidative and thermal deterioration. The alkyl-substituted hydroquinone carbonate esters of the invention in fact display an enhanced effectiveness that can be described as synergistic in combinations with polyvalent metal carboxylates, thiodipropionate esters, organic phosphites, and stabilizers for enhancing the resistance of olefin polymers to copper and other heavy metal-catalyzed degradation.

Stabilizer systems of the invention comprising a carbonate ester of the invention and one or more other olefin polymer stabilizers can be formulated and marketed as such, ready for use by the converter of the olefin polymer into useful products.

A variety of olefin polymer stabilizers can be employed, of which the following are exemplary.

The organic phosphite can be any organic phosphite having one or more organic radicals attached to phosphorous through oxygen. These radicals can be monovalent radicals in the case of triphosphites, diphosphites and monophosphites, which can be defined by the formula:

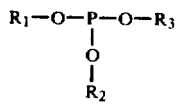

in which $R_1$, $R_2$ and $R_3$ are selected from the group consisting of hydrogen, alkyl, alkenyl, aryl, alkaryl, aralkyl, and cycloalkyl groups having from one to about thirty carbon atoms.

Also included are the organic phosphites having a bivalent organic radical forming a heterocyclic ring with the phosphorus of the type:

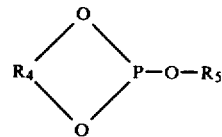

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$.

Also useful useful in the compositions of the invention are mixed heterocyclic-open chain phosphites of the type:

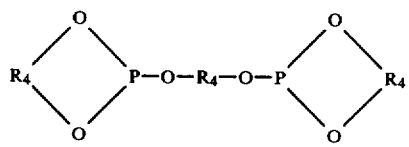

More complex phosphites are formed from trivalent organic radicals, of the type:

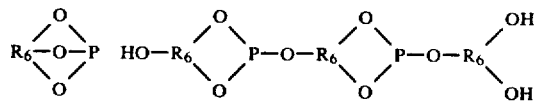

in which $R_6$ is a trivalent organic radical of any of the types of $R_1$ to $R_5$, inclusive, as defined above.

A particularly useful class of complex phosphites are the tetraoxadiphosphaspiro undecanes of the formula:

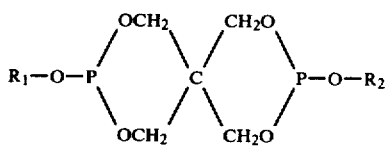

where $R_1$ and $R_2$ are selected from the group consisting of aryl, alkyl, aryloxyethyl, alkyloxyethyl, aryloxyethoxyethyl, alkyloxyethoxyethyl and alkyloxypolyethoxyethyl.

An expecially preferred class of organic phosphites have a bicyclic aromatic group attached to a phosphorus through oxygen, with no or one or more phenolic hydroxyl groups on either or both of the aromatic rings. These phosphites are characterized by the formula:

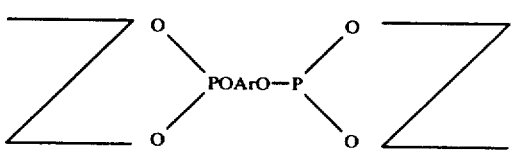

-continued

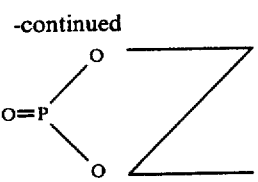

in which

Ar is a mono or bicyclic aromatic nucleus and m is an integer of from 0 to about 5. Z is one or a plurality of organic radicals as defined above for $R_1$ to $R_6$, taken singly or together in sufficient number to satisfy the valences of the two phosphite oxygen atoms. Z can also be hydrogen, and can include additional bicyclic aromatic groups of the type $(HO)_m$—Ar.

The term "organic phosphite" as used herein is inclusive of the above-described mono-, di- and triphosphites. Usually, the phosphite will not have more than about sixty carbon atoms.

Exemplary are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl)phosphite, trioctadecyl phosphite, triisooctyl phosphite, tridodecyl phosphite, isooctyl diphenyl phosphite, diisooctyl phenyl phosphite, tri(t-octylphenyl)phosphite, tri(t-nonylphenyl)phosphite, benzyl methyl isopropyl phosphite, butyl dicresyl phosphite, isooctyl di(octylphenyl)phosphite, di(2-ethylhexyl)-(isooctylphenyl)phosphite, tri(2-cyclohexylphenyl)phosphite, tri-α-naphthyl phosphite, tri(phenylphenyl)phosphite, tri(2-phenylethyl)phosphite, monododecyl phosphite, di-(p-tert-butyl phenyl) phosphite, decyl phenyl phosphite, tert-butyl-phenyl 2-ethylhexyl phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxyphosphorinane, 2-octoxy-5,5-dimethyl-dioxaphosphorinane, 2-cyclohexyloxy-5,5-diethyl dioxaphosphorinane, monophenyl phosphite, cresyl phosphite, t-octylphenyl phosphite, t-butyl phosphite, diphenyl phosphite, diisooctyl phosphite, dicresyl phosphite, dioctylphenyl phosphite, didodecyl phosphite, di-α-naphthyl phosphite, ethylene phosphite, butyl cresyl phosphite, phenyl-mono-2-ethylhexyl phosphite, isooctyl monotolyl phosphite and phenyl cyclohexyl phosphite.

Exemplary pentaerythritol triphosphites are 3,9-diphenoxy-2,4,8,10-tetraoxa-3,9-diphosphaspiro-(5,5)-undecane(diphenyl-pentaerythritoldiphosphite), 3,9-di(-decyloxy)-2,4,8,10-tetraoxa-3,9-diphosphaspiro(5,5)-undecane, 3,9-di(isodecyloxy)-2,4,8,10-tetraoxa-3,9-diphosphaspiro-(5,5)-undecane, 3,9-di(octadecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoxa-3,9-diphosphaspiro-(5,5)-undecane, 3,9-di(-lauryloxy)-2,4,8,10-tetraoxa-3,9-diphosphaspiro-(5,5)-undecane, 3,9-di-p-tolyloxy-2,4,8,10-tetraoxa-3,9-diphosphaspiro-(5,5)-undecane; 3,9-di(methoxyethyloxy)-2,4,8,10-tetraoxa-3,9-diphosphaspiro-(5,5)-undecane; 3-methoxyethyloxy-9-isodecyloxy-2,4,8,10-tetraoxa-3,9-diphosphaspiro-(5,5)-undecane; 3,9-di(ethoxyethyloxy)-2,4,8,10-tetraoxa-3,9-diphosphaspiro-(5,5)-undecane; 3,9-di(butoxyethyloxy)-2,4,8,10-tetraoxa-3,9-diphosphaspiro-(5,5)-undecane; 3-methoxyethyloxy-9-butoxyethyloxy-2,4,8,10-tetraoxa-3,9-diphosphaspiro-(5,5)-undecane; 3,9-di(methoxyethoxyethyloxy)-2,4,8,10-tetraoxa-3,9-diphosphaspiro-(5,5)-undecane; 3,9-di(butoxyethoxyethyloxy)-2,4,8,10-tetraoxa-3,9-diphosphaspiro-(5,5)-undecane; 3,9-di(methoxyethoxyethyloxy)-2,4,8,10-tetraoxa-3,9-diphosphaspiro-(5,5)-undecane; 3,9-di(methoxy(polyethoxy)ethyloxy)-2,4,8,10-tetraoxa-3,9-diphosphaspiro (5,5)-undecane (where the (polyethoxy) ethyloxy group has an average molecular weight of 350) 3,9-di(methoxy(polyethoxy)ethyloxy)-2,4,8,10-tetraoxa-3,9-diphosphaspiro-(5,5)-undecane (where the (polyethoxy)ethyloxy group has an average molecular weight of 550).

Exemplary of the bis aryl triphosphites are: bis(4,4'-thio-bis(2-tertiary butyl-5-methyl-phenol))isooctyl phosphite, mono (4,4'-thio-bis(2-tertiary-butyl-5-methyl-phenol))di-phenyl phosphite, tri-(4,4'-n-butylidene-bis(2-tertiary-butyl-5-methyl-phenol))phosphite, (4,4'-benzylidene-bis(2-tertiary-butyl-5-methyl-phenol)-)diphenyl phosphite, isooctyl 2,2'-bis(-parahydroxyphenyl)propane phosphite, tridecyl 4,4'-n-butylidene-bis(2-tertiary-butyl-5-methylphenol)phosphite, 4,4'thiobis(2-tertiary-butyl-5-methylphenol)phosphite, 2-ethylhexyl-2,2'-methylene-bis(4-methyl-6,1'-methylcyclohexyl)phenol phosphite, tri(2,2'-bis-(para-hydroxyphenyl)propane)phosphite, tri(4,4'-thio-bis(2-tertiary-butyl-5-methyl-phenol)phosphite, isooctyl-(2,6-bis(2'-hydroxy-3,5-dinonylbenzyl)-4-nonyl phenyl))phosphite, tetra-tridecyl 4,4'-n-butylidene-bis(2-tertiary butyl-5-methyl phenyl)diphosphite, tetra-isooctyl 4,4'-thiobis(2-tertiary butyl-5-methyl phenyl)diphosphite, 2,2'-methylene-bis(4-methyl 6,1'-methyl cyclohexyl phenyl)polyphosphite, isooctyl-4,4'-isopropylidene-bisphenyl-polyphosphite, 2-ethylhexyl-2,2'-methylene-bis(4-methyl-6,1'-methyl-cyclohexyl)phenyl triphosphite, tetra-tridecyl-4,4'-oxydiphenyl diphosphite, tetra-n-dodecyl-4,4'-n-butylidene bis(2-tertiary-butyl-5-methylphenyl)diphosphite, tetra-tridecyl-4,4'-iso-propylidene bisphenyl diphosphite, hexa-tridecyl butane-1,1,3-tris(2'-methyl-51-tertiary-butylphenyl-4'-)triphosphite.

Although the alkyl-substituted hydroquinone carbonate esters of the invention contain free phenolic hydroxyl groups and therefore display some of the chemical characteristics of the phenolic antioxidants, the stabilizer systems of the invention can include an additional phenol antioxidant, containing one or more phenolic hydroxyl groups and one or more phenolic nuclei. Such additional phenol stabilizers can contain from about eight to about three hundred carbon atoms.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

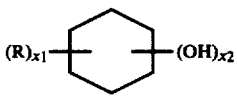

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl $$(R'C-)$$
$$\parallel$$
$$O$$

where R' is aryl, alkyl or cycloalkyl.

$x_1$ and $x_2$ are integers from one to four, and the sum of $x_1$ and $x_2$ does not exceed six.

The polycyclic phenol employed in the stabilizer combination is one having at least two aromatic nuclei linked by a polyvalent linking radical, as defined by the formula:

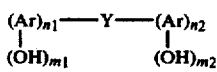

wherein

Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms.

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar—Y—Ar—Y—Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents. Examples of such inert substituents include hydrogen, halogen atoms, e.g. chlorine, bromine and fluorine; organic radicals containing from one to about thirty carbon atoms, such as alkyl, aryl, alkaryl, aralkyl, cycloalkenyl, cycloalkyl, alkoxy, aryloxy and acyloxy $$(R'C-O)$$
$$\parallel$$
$$O$$

where R' is aryl, alkyl or cycloalkyl, or thiohydrocarbon groups having from one to about thirty carbon atoms, and carboxyl $$(-C-O-)$$
$$\parallel$$
$$O$$

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluorenyl groups.

When Ar is a benzene nucleus, the polyhydric polycyclic phenol has the structure:

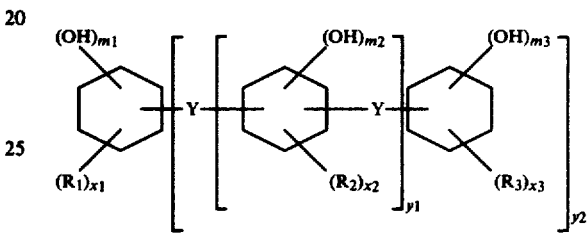

wherein $R_1$, $R_2$ and $R_3$ are inert substituent groups as described in the previous paragraph;

$m_1$ and $m_3$ are integers from one to a maximum of five;

$m_2$ is an integer from one to a maximum of four;

$x_1$ and $x_3$ are integers from zero to four, and $x_2$ is an integer from zero to three;

$y_1$ is an integer from zero to about six and $y_2$ is an integer from one to five, preferably one or two.

Preferably, the hydroxyl groups are located ortho and/or para to Y.

Exemplary Y groups are alkylene, alkylidene, and alkylene arylene, alkyl arylene, arylalkylene, cycloalkylene, cycloalkylidene, and oxa- and thia-substituted such groups; carbonyl groups, tetrahydrofuranes, esters and triazino groups. The Y groups are usually bi, tri, or tetravalent, connecting two, three or four Ar groups. However, higher valence Y groups, connecting more than four Ar groups can also be used. According to their constitution, the Y groups can be assigned to subgenera as follows:

(1) Y groups where at least one carbon in a chain or cyclic arrangement connect the aromatic groups, such as:

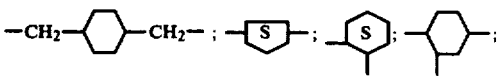

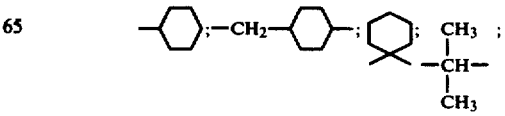

-continued

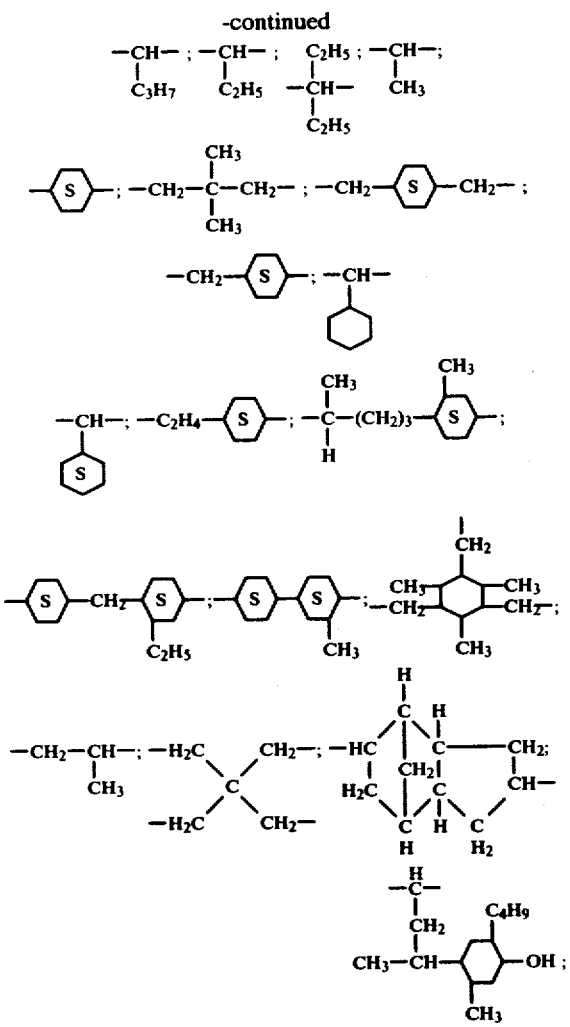

(2) Y groups where only atoms other than carbon link the aromatic rings, such as

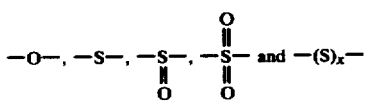

where x is a number from one to ten;

(3) Y groups made up of more than a single atom including both carbon and other atoms linking the aromatic nuclei, such as:

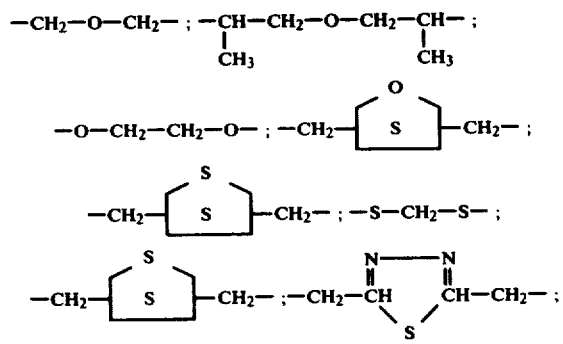

-continued

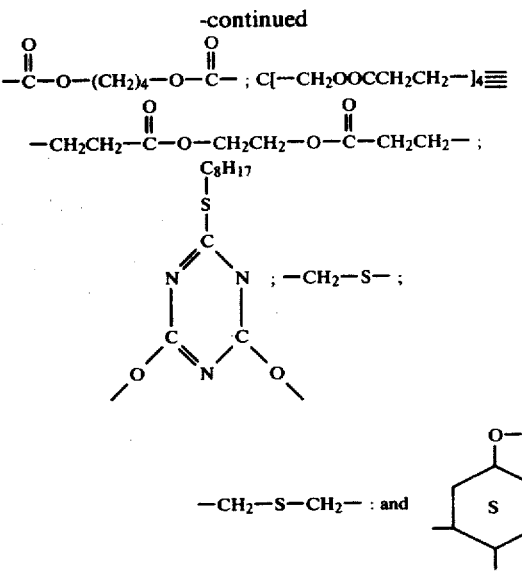

Although the relation of effectiveness to chemical structure is insufficiently understood, many of the most effective phenols have Y groups of subgenus (1), and accordingly thus is preferred. Some of these phenols can be prepared by the alkylation of phenols or alkyl phenols with polyunsaturated hydrocarbons such as dicyclopentadiene or butadiene.

Representative phenols include guaiacol, resorcinol monoacetate, vanillin, butyl salicylate, 2,6-di-tert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenylphenol, o-, m- and p-xylenols, the carvenols, symmetrical xylenol, thymol, o-, m- and p-nonylphenol, o-, m- and p-dodecyl-phenol, and o-, m- and p-octyl-phenol, o-, and m-tert-butyl-p-hydroxy-anisole, p-n-decyloxyphenol, p-n-decyloxy-cresol, nonyl-n-decyloxy-cresol, eugenol, isoeugenol, glyceryl monosalicylate, methyl-p-hydroxy-cinnamate, 4-benzyloxy-phenol, p-acetylaminophenol, p-stearyl-aminophenol methyl-p-hydroxybenzoate, p-di-chlorobenzoyl-aminophenol, and p-hydroxysalicyl anilide.

Exemplary polyhydric phenols are orcinol, propyl gallate, catechol, resorcinol, 4-octyl-resorcinol, 4-dodecyl-resorcinol, 4-octadecyl-catechol, 4-isooctyl-phloroglucinol, pyrogallol, hexahydroxybenzene, 4-isohexyl-catechol, 2,6-di-tertiary-butyl-resorcinol, 2,6-di-isopropyl-phloroglucinol.

Exemplary polyhydric polycyclic phenols are methylene bis-(2,6-di-tertiary-butyl-phenol), 2,2-bis-(4-hydroxy phenyl)-propane, methylene-bis-(p-cresol), 4,4'-benzylidene bis-(2-tertiary-butyl-5-methyl-phenol), 4,4'cyclohexylidene bis-(2-tertiary-butylphenol), 2,2'-methylene-bis-(4-methyl-6-(1'-methylcyclohexyl)-phenol), 2,6-bis-(2'-hydroxy-3'-tertiary-butyl-5'-methylbenzyl)-4-methylphenol, 4,4'-bis-(2-tertiary-butyl-5-methyl-phenol), 2,2'-bis-(4-hydroxy-phenyl)butane, ethylene bis-(p-cresol), 4,4'-oxobis-phenol, 4,4'-oxobis(3-methyl-5-isopropyl-phenol), 4,4'-oxobis-(3-methyl-phenol), 2,2'-oxobis-(4-dodecyl-phenol), 2,2'-oxobis-(4-methyl-5-tertiary-butyl-phenol), 4,4'-thio-bis-phenol; 4,4'-thio-bis-(3-methyl-6-tertiary-butyl-phenol), 2,2'-thio-bis-(4-methyl-6-tertiary-butyl-phenol), 4,4'-n-butylidene-(2-t-butyl-5-methyl-phenol) 2,2'-methylenebis-(4-methyl-6-(1'-methyl-cyclohexyl)-phenol), 4,4'cyclohexylene bis-(2-tertiary-butyl-phenol), 2,6-bis-(2'-hydroxy-3'-t-butyl-5'-methyl-benzyl)-4-methyl-phenol, 4,4'-oxobis(naphthalene-1,5-diol), 1,3'-bis-(naphthalene-2,5-diol)propane, and 2,2'-butylene bis-(naphthalene-2,7-diol), (3-methyl-5-tert-butyl-4-hydroxyphenyl)-4'-hydroxy-phenyl)propane, 2,2'-methylene-bis-(4-methyl-5-isopropylphenol), 2,2'methylene bis-(5-tert-butyl-4-chlorophenol), (3,5-di-tert-butyl-4-hydroxyphenyl)-(4'-hydroxy-phenyl)ethane, (2-hydroxy-phenyl)-(3',5'-di-tert-butyl-4',4-hydroxyphenyl)ethane, 2,2'-methylene bis-(4-octylphenol), 4,4'-propylene bis-(2-tert-butyl-phenol), 2,2'-isobutylene bis-(4-nonylphenol), 2,4-bis-(4-hydroxy-3-t-butyl-phenoxy)-6-(n-octylthio)-1,3,5-triazine, 2,4,6-tris-(4-hydroxy-3-t-butyl-phenoxy)-1,3,5-triazine, 2,2'-bis-(3-t-butyl-4-hydroxyphenyl) thiazolo-(5,4-d) thiazole, 2,2'-bis-(3-methyl-5-t-butyl-4-hydroxyphenyl)thiazolo-(5,4-d)-thiazole, 4,4'-bis-(4-hydroxyphenyl)pentanoic acid octadecyl ester, cyclopentylene-4,4'-bis-phenol, 2-ethylbutylene-4,4'-bisphenol, 4,4'-cyclooctylene-bis-(2-cyclohexylphenol), β,β-thiodiethanol bis-(3-tert-butyl-4-hydroxyphenoxy acetate), 1,4-butanedio bis-(3-tert-butyl-4-hydroxyphenoxy acetate), pentaerythritoltetra (4-hydroxyphenol propionate), 2,4,4'-tri-hydroxy benzophenone, bis-(2-tert-butyl-3-hydroxy-5-methylphenyl)sulfide, bis-(2-tert-butyl-4-hydroxy-5-methylphenyl)sulfide, bis-(2-tert-butyl-4-hydroxy-5-methyl-phenyl sulfoxide), bis-(3-ethyl-5-tert-butyl-4-hydroxy benzyl)sulfide, bis-(2-hydroxy-4-methyl-6-tert-butyl phenyl)sulfide, 4,4'-bis-(4-hydroxy-phenol)pentanoic acid octadecyl thiopropionate ester, 1,1,3-tris-(2'-methyl-4-hydroxy-5'-tert-butylphenyl)butane, 1,1,3-tris-(1-methyl-3-hydroxy-4-tert-butylphenyl)butane, 1,8-bis-(2-hydroxy-5-methyl-benzoyl-n-octane, 2,2'-ethylene-bis-[4'-(3-tert-butyl-4-hydroxyphenyl)-thiazole], 1-methyl-3-(3-methyl-5-tert-butyl-4-hydroxybenzyl)-naphthalene, 2,2'-(2-butene)-bis-(4-methoxy-6-tert-butyl phenol)-bis-[3,3-bis-(4-hydroxy-3-t-butylphenyl)butyric acid] glycol ester, 4,4'-butylidene bis-(6-t-butyl-m-cresol), 1,1,3-tris-(2-methyl-4-hydroxy-5-,t-butylphenyl) butane, 1,3,5-tris-(3,5-di-t-butyl-4-hydroxybenzyl)-2,4,6-trimethylbenzene, tetrakis [methylene-3(3,5-di-t-butyl-4-hydroxyphenyl)propionate]methane, 1,3,5-tris-(3,5-di-t-butyl-4-hydroxybenzyl)isocyanurate, 1,3,5-tris-(3,5-di-t-butyl-4-hydroxyphenyl)propionyl-oxyethyl isocyanurate, 2-octylthio-4,6-di-(4-hydroxy-3,5-di-t-butyl)phenoxy-1,3,5-triazine, 4,4'thiobis(6-t-butyl-m-cresol) and pentaerythritol hydroxyphenyl propionate.

A particularly desirable class of polyhydric polycyclic phenols are the dicyclopentadiene polyphenols, which are of the type:

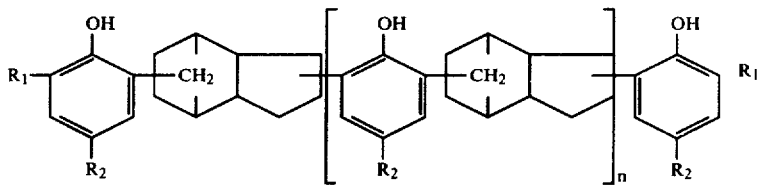

in which

R₁ and R₂ are lower alkyl, and can be the same or different, and n is the number of the groups enclosed by the brackets, and is usually from 1 to about 5. These are described in U.S. Pat. No. 3,567,683, dated Mar. 2, 1971 to Spacht. A commercially available member of this class is Wingstay L, exemplified by dicyclopentadiene tri-(2-tert-butyl-4-methyl-phenol) of the formula:

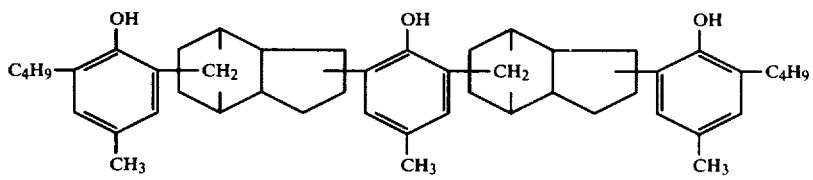

The polyhydric polycyclic phenols used in the invention can also be condensation products of phenol or alkylphenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus 1. For method of preparation, see e.g., U.S. Pat. No. 3,124,555, U.S. Pat. No. 3,242,135 and British Pat. No. 961,504.

The thiodipropionic acid ester has the following formula:

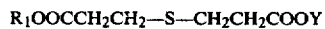

in which

R₁ is an organic radical selected from the group consisting of hydrocarbon radicals such as alkyl, alkenyl, aryl, cycloalkyl, mixed alkyl aryl, and mixed alkyl cycloalkyl radicals; and esters thereof with aliphatic carboxylic acids; and Y is selected from the group consisting of (a) hydrogen, (b) a second R radical R₂, which can be the same as or different from the R₁ radical, (c) a polymeric chain of n thiodipropionic acid ester units:

R₁O[OCCH₂CH₂SCH₂CH₂COOXO]ₙOCCH₂C-
H₂—S—CH₂CH₂COOZ wherein
Z is hydrogen, R₂ or M;
n is the number of thiodipropionic acid ester units in the chain; and
X is a bivalent hydrocarbon group of the type of R₁; the value of n can range upwards from 1, but there is no upper limit on n except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule, the thiodipropionic ester has a total of from about ten to about sixty carbon atoms per sulfur atom.

Accordingly, the various thiodipropionic acid ester species coming within the above-mentioned categories within the general formula can be defined as follows:

(a) R₁OOCCH₂CH₂SCH₂CH₂COOH
(b) R₁OOCCH₂CH₂SCH₂CH₂COOR₂
(c) R₁O[OCCH₂CH₂SCH₂CH₂COOX—O]-ₙOCCH₂CH₂SCH₂CH₂COOZ
(d) [R₁OOCCH₂CH₂SCH₂CH₂COO]₂M

In the above formulae, R₁ and R₂, M, X and Z are the same as before. In the polymer (c), as in the other forms of thiodipropionic acid esters, the total number of carbon atoms per sulfur atom is within the range from about ten to about sixty.

The R radical of these esters is important in furnishing compatibility with the polypropylene. The Y radical is desirably a different radical, R₂ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,2-propylene

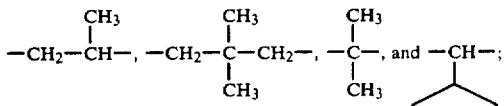

arylene radicals such as phenylene

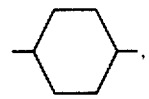

methylenephenylene

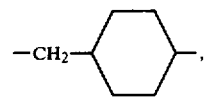

dimethylene phenylene,

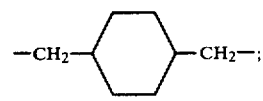

and alicyclene radicals, such as cyclohexylene

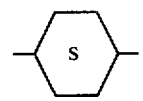

and cyclopentylene

As exemplary of the thiodipropionic acid esters which can be used, there can be mentioned the following: monolauryl thiodipropionic acid, dilauryl thiodipropionate, butyl stearyl thiodipropionate, di-(2-ethylhexyl)-thiodipropionate, diisodecylthiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl)thiodipropionic acid.

These esters are for the most part known compounds, but where they are not available, they are readily prepared by esterification of thiodipropionic acid and the corresponding alcohol.

When the compound is used in conjunction with a polyvalent metal salt of an organic acid, the organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reactions, such as by mixing the acid, or anhydride with the corresponding oxide or hydroxide of the metal in a liquid solvent, and heating, if necessary, until salt formation is complete.

The hydrocarbon sulfides and polysulfides can contain one sulfur atom or two or more sulfur atoms linked in a polysulfide unit. Usually, the sulfides and polysulfides will not have more than fifty carbon atoms. They can be defined by the formula

wherein
n is the number of sulfur atoms and ranges from one to about six; and

R is an organic radical having from one to about thirty carbon atoms, such as alkyl, aryl, alkaryl, aralkyl, and cycloalkyl.

The following compounds are typical: dibutyl sulfide, didecyl sulfide, diphenyl sulfide, dibenzyl sulfide, butyl octyl sulfide, di-n-dodecyl trisulfide, di-tertiary dodecyl disulfide, di-para-tertiary butyl phenyl trisulfide, dibenzyl disulfide, dibenzyl tetrasulfide, and dibenzyl trisulfide.

Light stabilizers for olefin polymers can also be added, for example, 2-hydroxy benzophenones, o-hydroxyphenyl-benzotriazoles, 1-dioxides of $\alpha,\beta$-benzoisothiazolone and 1,3,5-triazines and nickel organophosphites as disclosed in application Ser. No. 487,614, now U.S. Pat. No. 3,395,112, dated July 30, 1968.

The preferred stabilizer system of the invention comprises one or more of the carbonate esters of the invention and one, two or three olefin polymer stabilizers selected from thiodipropionic acid ester, organic phosphites, and polyvalent metal salts of organic acids. These olefin polymer stabilizers together give an enhanced stabilization which is not obtainable from any of them alone or in combinations of two or three with the carbonate esters of the invention.

When the olefin polymer compositions are to come into contact with copper or other heavy metals, such as lead, cobalt and chromium, a heavy metal deactivator can also be employed. For this purpose, conventional copper chelating agents and metal deactivators can be used, including the compounds described by Hansen, *Journal of Polymer Science* Part A2, 587–609 (1964), British Pat. No. 974,274, Hansen et al *Polymer Engineering and Science* Vol 5, October 1965, pp 233 to 236, U.S. Pat. No. 3,110,696 to Dexter, U.S. Pat. No. 3,117,104 to Bowen et al, U.S. Pat. Nos. 3,549,572, 3,629,189, 3,673,152 and 3,849,370 to Minagawa et al.

Very small amounts of such copper deactivators can significantly reduce the catalytic effect of heavy metals on the rate of degradation of the olefin polymer. Amounts within the range from about 0.001 to about 5% by weight of the polypropylene are satisfactory. Preferably, from 0.05 to 1% is employed.

The amount of total stabilizer, including the carbonate ester of the invention, is within the range from about 0.001 to about 5%, preferably from 0.01 to 3.5%. All of this can be the carbonate of the invention. The preferred olefin polymer stabilizer system comprises from about 0.01 to about 1.5% carbonate ester of the invention, from about 0.05 to about 1% thiodipropionic acid ester, and from about 0.025 to about 0.75% polyvalent metal carboxylate; and optionally, from about 0.05 to about 1.25% of a phosphite, when present.

The carbonate esters of the invention and any other olefin polymer stabilizers may be formulated as a simple mixture for incorporation in the polymer by the polymer manufacturer or by the converter. An inert organic solvent can be used to facilitate handling, if the ingredients do not form a homogeneous mixture or solution.

Polypropylene solid polymer can be defined in a manner to differentiate it from other polyolefins as having a density within the range from 0.86 to 0.91, and a melting point above 150° C. The stabilizer of the invention is applicable to all such polypropylenes, as distinguished from polypropylenes in the liquid form or in semi-liquid or gel-like forms, such as are used as greases and waxes.

The stabilizer system of the invention is applicable to polypropylenes prepared by any of the various procedures, for the molecular weight and tacticity are not factors affecting this stabilizer. Isotactic polypropylene, available commercially under the trade names Profax, Escon, Olefane and Amoco, and having a softening or hot-working temperature of about 350° F., is an example of a sterically regular polypropylene polymer.

Mixtures of polypropylene with other compatible polymers and copolymers of propylene with copolymerizable monomers also can be improved in accordance with this invention. For example, mixtures of polyethylene and polypropylene, and copolymers of propylene and ethylene which contain a sufficient amount of propylene to present the instability problem that is resolved by the compounds of the invention, may be improved by the addition of one or more of the compounds of the invention, alone or in combination with other polypropylene stabilizers.

The stabilizer systems of the invention may also be used with polyethylene, and with polyolefins higher than polypropylene, such as polybutylene and polyisobutylene.

The carbonate esters of the invention and stabilizer systems including the same are incorporated in the polymer in suitable mixing equipment, such as a mill or a Banbury mixer. If the polypropylene has a melt viscosity which is too high for the desired use, the polypropylene can be worked until its melt viscosity has been reduced to the desired range before addition of the stabilizer. However, polypropylenes in a range of workable melt viscosities are now available. Mixing is continued until the mixture is substantially uniform. The resulting composition is then removed from the mixing equipment and brought to the size and shape desired for marketing or use.

The stabilized polypropylene can be worked into the desired shape, such as by milling, calendering, extrusion or injection molding or fiberforming. In such operations, it will be found to have a considerably improved resistance to reduction in melt viscosity during the heating, as well as a better resistance to discoloration and embrittlement on aging and heating.

The stabilizing effect of the stabilizer mixtures of the invention was evaluated in these Examples in accordance with the following test procedures. The standard sample used in testing was 200 g. The stabilizers were incorporated as described in the working Examples and milled to a sheet. Pieces cut from the milled sheet were then used in the test procedures.

COMPRESSION MOLDING, 260° C. (RESISTANCE TO EMBRITTLEMENT AND LOSS OF PLASTICITY)

Pieces cut from a milled sheet are compression-molded at 260° C. for five minutes to give 1×1 inch squares 0.125 inch thick. Plasticity and color are then noted.

HEAT AGEING, 150° C. OVEN (HEAT STABILITY OF MOLDED SAMPLES)

Molded samples made as above are heated flat on aluminum foil in an air circulating oven at 150° C. Samples are removed daily and examined for cracking or powdering, either of which constitutes failure.

The following Examples in the opinion of the inventors represent preferred embodiments of the invention:

EXAMPLE 1

The carbonate ester of Example I was evaluated for stabilizing effect in a stabilizer mixture including calcium stearate, distearyl thiodipropionate, and an antioxidant. In each case, a total of 0.55% stabilizer was used. The stabilizers were weighed and dispersed by hand, stirring in powdered previously unstabilized polypropylene (Pro-Fax 6501). The mixture was placed on a two-roll mill and fluxed for five minutes at 170°±2° C. Pieces cut from the milled sheet were used in the standard 150° C. oven test described above. One set of samples was subjected to the oven test at once. Another set was immersed in boiling water and held there for fourteen days, and then subjected to the oven test. The parts of stabilizer given are per 100 parts of polypropylene resin.

| Ingredient | Parts by Weight |
|---|---|
| Profax 6501 | 100 |
| Calcium stearate | 0.1 |
| Distearyl thiodipropionate | 0.3 |
| Antioxidant as listed in Table IV | 0.15 |

The test results are given in Table IV:

TABLE IV

| Antioxidant | Hours to Failure | |
|---|---|---|
|  | Freshly prepared | After $H_2O$ immersion |
| 1,1,3-tris-(2'-methyl-4'hydroxy-5-t-butyl phenyl) butane | 1652 | 521 |
| Pentaerythritol tetrakis 3-(3',5'-di-t-butyl-4'-hydroxy phenyl) propionate | 2490 | 3262 |
| Carbonate ester of 2,5-di-t-butyl hydroquinone | 2706 | 4869 |

The dialkyl hydroquinone carbonate ester is clearly a much more powerful antioxidant then either of the two other antioxidants, which are wellaccepted commercialized products.

The increased heat stability of polypropylene after long immersion in boiling water shows that the antioxidant is hydrolytically stable, and benefits from whatever removal or deactivation of catalytic metal impurities is accomplished by the prolonged water treatment.

EXAMPLE 2

A carbonate ester of the invention, 2,5-di-t-butyl hydroquinone bis-(phenyl carbonate) was evaluated for stabilizing effect in a stabilizer mixture similar to Example 1, containing calcium stearate and distearyl thiodipropionate. The stabilizers were weighed and dispersed by hand, stirring in powdered previously unstabilized polypropylene (Amoco). The mixture was placd on a two-roll mill and fluxed for five minutes at 170°±2° C. Pieces cut from the milled sheet were molded in 1×1×0.125 inch squares at 260° C. for fifteen minutes. Color was rated after five and after fifteen minutes of heating. The parts of stabilizer given are per 100 parts of polypropylene resin.

| Ingredient | Parts by Weight |
|---|---|
| Amoco polypropylene | 100 |
| Calcium stearate | 0.1 |
| Distearyl thiodipropionate | 0.3 |

| Ingredient | Parts by Weight |
| --- | --- |
| Antioxidant as shown in Table V | 0.1 |

The results of the tests were as follows:

TABLE V

| | Color Rating | |
| --- | --- | --- |
| Antioxidant | After 5 minutes at 260° C. | After 15 minutes at 260° C. |
| 1,1,3-tris-(2'-methyl-4'-hydroxy-5'-t-butyl phenyl)butane | Light beige | Tan |
| PC-10 Commercial polycarbonate | Off white | Light beige |
| 2,5-di-t-butyl hydroquinone bis-(phenyl carbonate) | Colorless | Colorless |

The superior color stability of polypropylene molded at a high temperature with the dialkyl hydroquinone carbonate ester stabilizer is evident from the test results.

EXAMPLE 3

The carbonate ester of Example I was evaluated for stabilizing effect in a stabilizer mixture including calcium stearate, distearyl thiodipropionate, and an antioxidant. In each case, a total of 0.5% stabilizer was used. The stabilizers were weighed and dispersed by hand, stirring in powdered previously unstabilized polypropylene (Pro-Fax 6501). The mixture was placed on a two-roll mill and fluxed for five minutes at 170°±2° C. Pieces cut from the milled sheet were used in the standard 150° C. oven test described above. The parts of stabilizer given are per 100 parts of polypropylene resin.

| Ingredient | Parts by Weight |
| --- | --- |
| Profax 6501 | 100 |
| Calcium stearate | 0.1 |
| Distearyl thiodipropionate | 0.3 |
| Antioxidant as listed in Table VI | 01. |

The test results are given in Table VI:

TABLE VI

| Antioxidant | Hours to Failure |
| --- | --- |
| 1,1,3,-tris-(2'-methyl-4'-hydroxy-5-t-butyl phenyl) butane | 3138 |
| Pentaerythritol tetrakis 3-(3',5'-di-t-butyl-4'-hydroxy phenyl)propionate | 2970 |
| Carbonate ester of 2,5-di-t-butyl hydroquinone of Example I | 3642 |

The dialkyl hydroquinone carbonate ester is clearly a much more powerful antioxidant than either of the two other antioxidants, which are wellaccepted commercialized products.

EXAMPLES 4 AND 5

The carbonate esters of Example III and VII were evaluated for stabilizing effect in a stabilizer mixture including calcium stearate, distearyl thiodipropionate, and commercial polycarbonate stabilizer. In each case, a total of 0.55% stabilizer was used. The stabilizers were weighed and dispersed by hand, stirring in powdered previously unstabilized polypropylene (Pro-Fax 6501). The mixture was placed on a two-roll mill and fluxed for five minutes at 170°±2° C. Pieces cut from the milled sheet were used in the standard 150° C. oven test described above. The parts of stabilizer given are per 100 parts of polypropylene resin.

| Ingredient | Parts by Weight |
| --- | --- |
| Profax 6501 polypropylene | 100 |
| Calcium stearate | 0.2 |
| Distearyl thiodipropionate | 0.25 |
| Antioxidant as listed in Table VII | 0.1 |

The test results are given in Table VII:

TABLE VII

| Example No. | Carbonate Ester | Hours to Failure |
| --- | --- | --- |
| Control | PC-10 (Exxon) commercial polycarbonate stabilizer | 2051 |
| 4 | 2,5-di-t-butyl hydroquinone carbonate ester of Example III | 2459 |
| 5 | 2,5-di-t-amyl hydroquinone carbonate ester of Example VII | 2295 |

The dialkyl hydroquinone carbonate esters of the invention are clearly much more powerful antioxidants than the polycarbonate ester, which is a wellaccepted commercialized product.

EXAMPLE 6

A carbonate ester of the invention, 2,5-di-t-butyl hydroquinone bis-(phenyl carbonate), was evaluated for stabilizing effect in a stabilizer mixture similar to Example 1, containing calcium stearate and distearyl thiodipropionate. The stabilizers were weighed and dispersed by hand, stirring in powdered previously unstabilized polypropylene (Amoco). The mixture was placed on a two-roll mill and fluxed for five minutes at 170°±2° C. Pieces cut from the milled sheet were used in the standard 150° C. oven test described above. The parts of stabilizer given are per 100 parts of polypropylene resin.

| Ingredient | Parts by Weight |
| --- | --- |
| Amoco polypropylene | 100 |
| Calcium stearate | 0.1 |
| Distearyl thiodipropionate | 0.3 |
| Antioxidant as shown in Table VIII | 0.1 |

The results of the tests were as follows:

TABLE VIII

| Antioxidant | Hours to Failure |
| --- | --- |
| 1,1,3-tris-(2'-methyl-4'-hydroxy-5-t-butylphenyl) butane | 1627 |
| Pentaerythritol tetrakis 3-(3',5'-di-t-butyl-4'-hydroxyphenyl) propionate | 2970 |
| 2,5-di-t-butyl hydroquinone carbonate ester of Example I | 4027 |

The dialkyl hydroquinone carbonate ester is clearly a much more powerful antioxidant than either of the two other antioxidants, which are wellaccepted commercialized products.

Having regard to the foregoing disclosure, the following is claimed as inventive and patentable embodiments thereof:

1. An alkyl-substituted hydroquinone carbonate ester having a molecular weight within the range from 342 to 646 and defined by the formula:

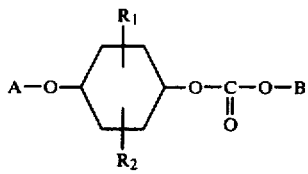

wherein:
R₁ and R₂ are selected from the group consisting of t-butyl and t-amyl; and
A and B are selected from the group consisting of hydrogen and

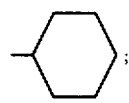

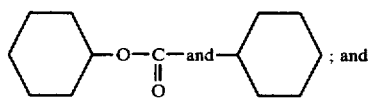

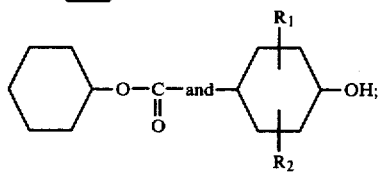

respectively.

2. An alkyl-substituted hydroquinone carbonate ester according to claim 1, in which A and B are hydrogen and

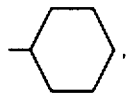

respectively.

3. An alkyl-substituted hydroquinone carbonate ester according to claim 1, in which A and B are

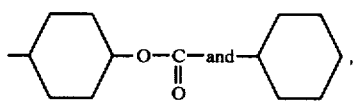

respectively.

4. An alkyl-substituted hydroquinone carbonate ester according to claim 1, in which A and B are

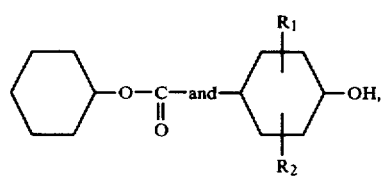

respectively.

5. An alkyl-substituted hydroquinone carbonate ester according to claim 1, in which B is

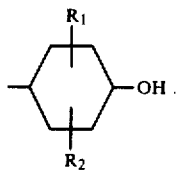

6. An alkyl-substituted hydroquinone carbonate ester according to claim 1, in which R₁ and R₂ are each t-butyl.

7. An alkyl-substituted hydroquinone carbonate ester according to claim 1, in which R₁ and R₂ are each t-amyl.

8. An alkyl-substituted hydroquinone carbonate ester according to claim 1, in which one of R₁ and R₂ is t-butyl and one is t-amyl.

9. An alkyl-substituted hydroquinone carbonate ester according to claim 1, in which R₁ and R₂ are in the 2,5-positions.

10. An alkyl-substituted hydroquinone carbonate ester according to claim 1, in which R₁ and R₂ are in the 2,6-positions.

11. An alkyl-substituted hydroquinone carbonate ester according to claim 1, in which R₁ and R₂ are in the 2,3-positions.

12. An alkyl-substituted hydroquinone carbonate ester according to claim 1, in which
A is hydrogen;
R₁ and R₂ are t-butyl; and
B is

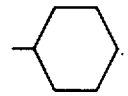

13. An alkyl-substituted hydroquinone carbonate ester according to claim 1, in which
A is

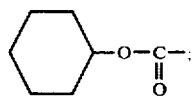

R₁ and R₂ are t-butyl; and
B is

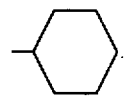

14. An alkyl-substituted hydroquinone carbonate ester according to claim 1, in which
A is hydrogen;
R₁ and R₂ are t-amyl; and
B is 15. An alkyl substituted hydroquinone carbonate ester according to claim 1, in which
A is

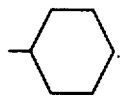

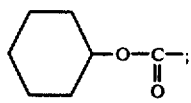

$R_1$ and $R_2$ are t-amyl; and
B is

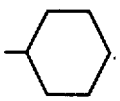

16. Alpha-monoolefin polymer compositions having an enhanced resistance to oxidative and thermal degradation consistig essentially of an alpha-monoolefin polymer and at least one alkyl-substituted hydroquinone carbonate ester according to claim 1.

17. An alpha-monoolefin polymer composition in accordance with claim 16, wherein the alpha-monoolefin polymer is a propylene polymer.

18. An alpha-monoolefin polymer composition in accordance with claim 17, wherein the propylene polymer is polypropylene.

19. An olefin polymer composition in accordance with claim 16, including, in addition, at least one alpha-monoolefin polymer stabilizer selected from the group consisting of organic phosphites, alkyl-substituted phenols and polynuclear phenols, thiodipropionic acid esters, polyvalent metal salts of organic acids, hydrocarbon sulfides and polysulfides and alpha-monoolefin polymer light stabilizers, the stabilizer being compatible with polypropylene and having a low vapor pressure at alpha-monoolefin polymer working temperatures.

20. An alpha-monoolefin polymer composition in accordance with claim 19, wherein the alpha-monoolefin polymer stabilizer is a phosphite.

21. An alpha-monoolefin polymer composition in accordance with claim 19, wherein the alpha-monoolefin polymer stabilizer is a thiodipropionic acid ester.

22. An alpha-monoolefin polymer composition in accordance with claim 19, wherein the alpha-monoolefin polymer stabilizer is a combination of a phosphite and a thiodipropionic acid ester.

23. An alpha-monoolefin polymer composition in accordance with claim 19, wherein the alpha-monoolefin polymer stabilizer is a combination of a polyvalent metal salt of an organic acid, a thiodipropionic acid ester, and an organic phosphite.

24. An alpha-monoolefin polymer composition in accordance with claim 19, wherein the alpha-monoolefin polymer stabilizer is a combination of a polyvalent metal salt of an organic acid, and an organic phosphite.

25. An alpha-monoolefin polymer composition in accordance with claim 16 in which $R_1$ and $R_2$ of the carbonate ester are tertiary butyl.

26. An alpha-monoolefin polymer composition in accordance with claim 16, in which $R_1$ and $R_2$ of the carbonate ester are tertiary amyl.

27. An alpha-monoolefin polymer composition in accordance with claim 16, in which A of the carbonate ester is hydrogen and B is

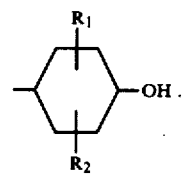

28. An alpha-monoolefin polymer composition in accordance with claim 16, in which A of the carbonate ester is hydrogen and B is

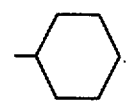

29. An alpha-monoolefin polymer composition in accordance with claim 16, in which A of the carbonate ester is

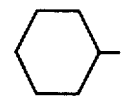

and B is

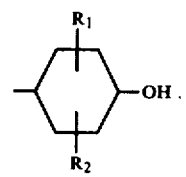

30. A stabilizer combination useful in the enhancement of resistance of alpha-monoolefin polymers to oxidative and thermal degradation consisting essentially of at least one alkyl-substituted hydroquinone carbonate ester according to claim 1, and at least one alpha-monoolefin polymer stabilizer selected from the group consisting of organic phosphites, alkyl-substituted phenols and polynuclear phenols, thiodipropionic acid esters, polyvalent metal salts of organic acids, hydrocarbon sulfides and polysulfides and alpha-monoolefin polymer light stabilizers, the stabilizers being compatible with polypropylene and having a low vapor pressure at olefin polymer working temperatures.

31. A stabilizer combination in accordance with claim 30, wherein the alpha-monoolefin polymer stabilizer is a phosphite.

32. A stabilizer combination in accordance with claim 30, wherein the alpha-monoolefin polymer stabilizer is a thiodipropionic acid ester.

33. A stabilizer combination in accordance with claim 30, wherein the alpha-monoolefin polymer stabilizer is a combination consisting essentially of a phosphite and a thiodipropionic acid ester.

34. A stabilizer combination in accordance with claim 30, wherein the alpha-monoolefin polymer stabilizer is a combination of a polyvalent metal salt of an organic acid, a thiodipropionic acid ester, and an organic phosphite.

35. A stabilizer combination in accordance with claim 30, wherein the alpha-monoolefin polymer stabilizer is a combination of a polyvalent metal salt of an organic acid, and an organic phosphite.

* * * * *